United States Patent [19]

Shoda

[11] Patent Number: 4,957,148

[45] Date of Patent: Sep. 18, 1990

[54] CHIP REMOVING DEVICE FOR MULTI-HEAD MACHINE TOOL

[76] Inventor: Isao Shoda, 1116-4, Okaba-cho, Hamamatsu, Shizuoka, Japan

[21] Appl. No.: 427,400

[22] Filed: Oct. 27, 1989

[30] Foreign Application Priority Data

Nov. 2, 1988 [JP] Japan ............................ 63-143961[U]
Apr. 5, 1989 [JP] Japan ................................. 64-86068

[51] Int. Cl.⁵ .............................................. B27G 19/00
[52] U.S. Cl. .................................. 144/252 R; 51/273; 408/67; 409/134; 409/137
[58] Field of Search ......................... 144/252 R, 252 A; 51/273; 83/100; 409/134, 137; 408/67

[56] References Cited

FOREIGN PATENT DOCUMENTS 13605 12/1983 Japan .
2117510 10/1983 United Kingdom .

*Primary Examiner*—W. Donald Bray
*Attorney, Agent, or Firm*—Sughrue, Mion, Zinn, Macpeak & Seas

[57] ABSTRACT

A chip removing device for a multi-head machine tool which is reduced in cost, facilitates maintenance thereof and allows adjustment of the distance between adjacent working heads by a comparatively great amount. The device comprises a duct having a slit formed in a lower wall thereof, and an expansible shutter for normally closing the slit. A connecting pipe extends upwardly from each of the working heads, and upper end portions of the connecting pipes extend in an airtight condition through the shutter into the duct. When a working head is moved, the shutter is partially expanded and contracted following the working head to maintain the closed condition of the slit. A seal plate is secured horizontally within the duct and disposed commonly to the working heads. The connecting pipe of a working head at an upper position is pressed at an upper end opening thereof against the seal plate to close the upper end opening in an airtight condition, but the upper end opening of the connecting pipe of another working head at a lower position is spaced away from the seal plate and is in an open condition.

5 Claims, 10 Drawing Sheets

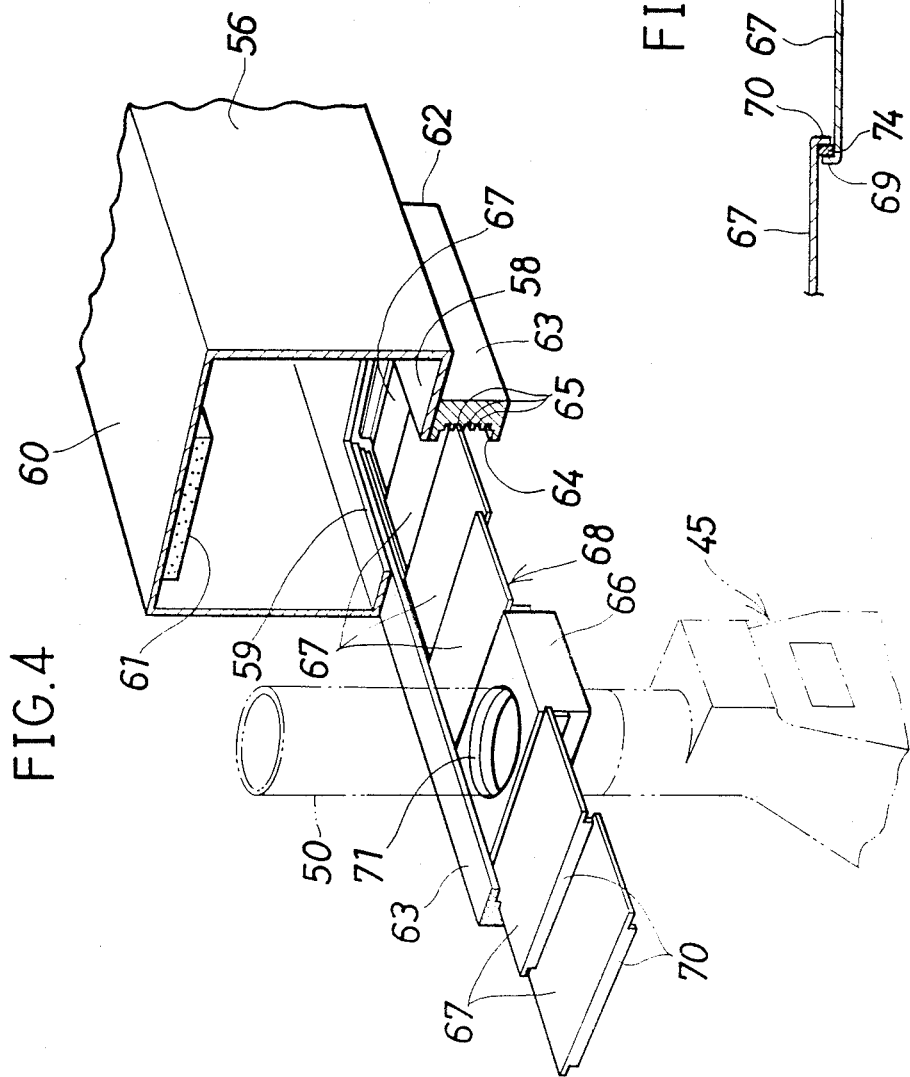

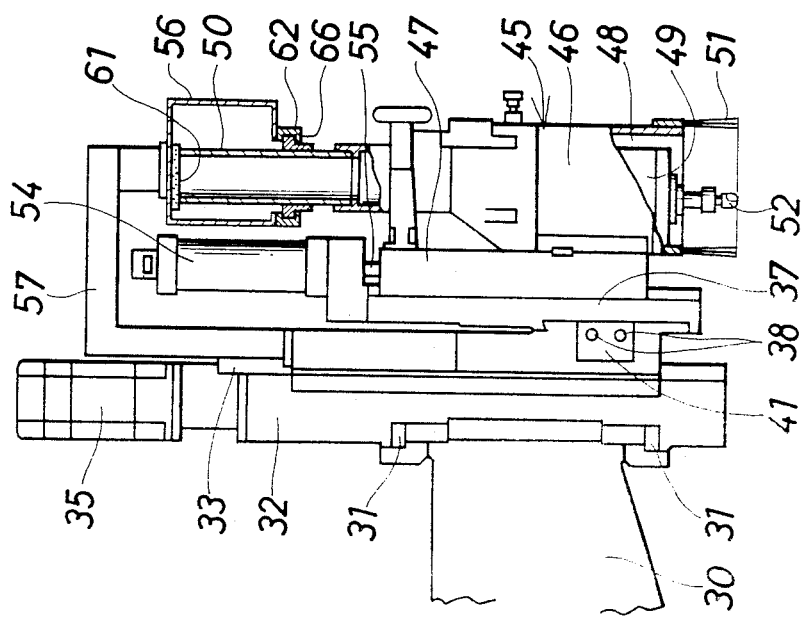

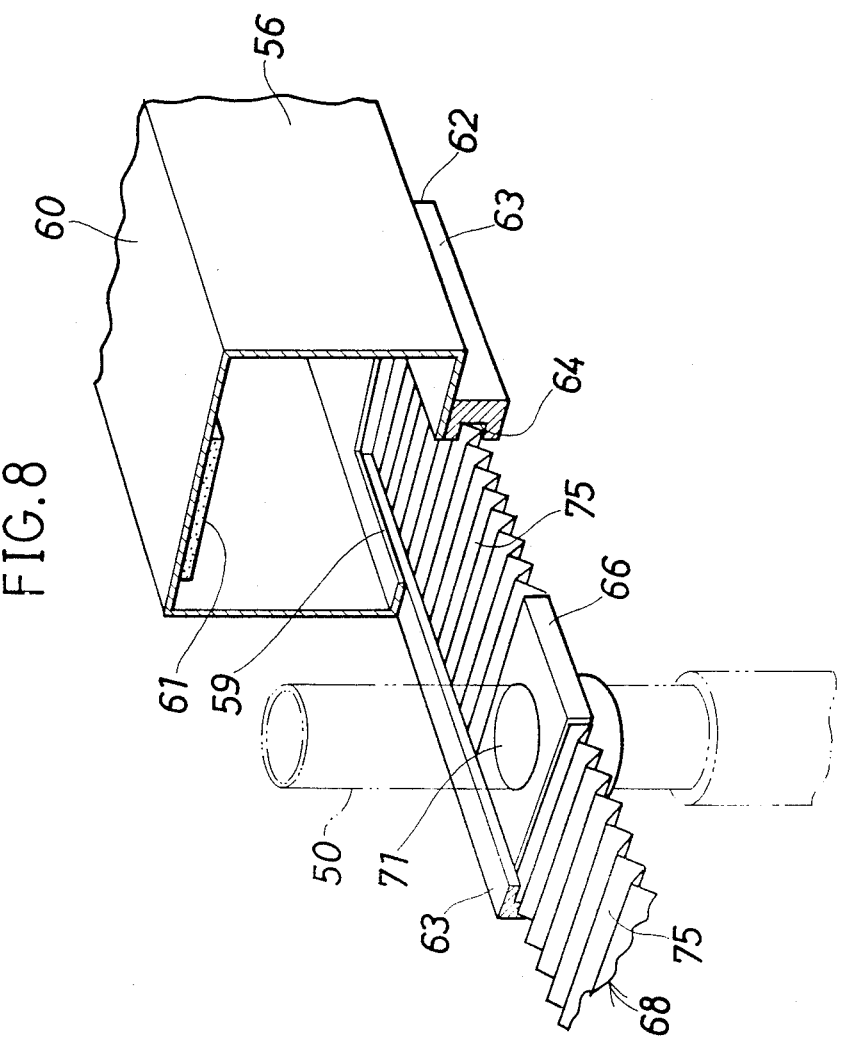

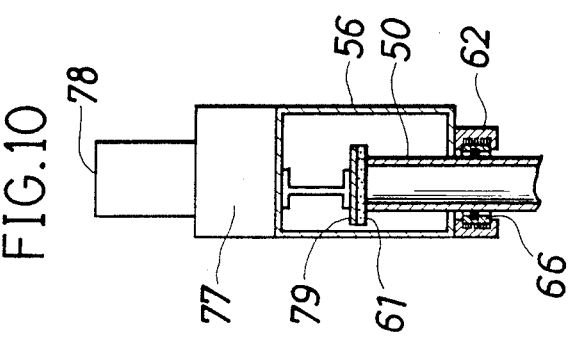
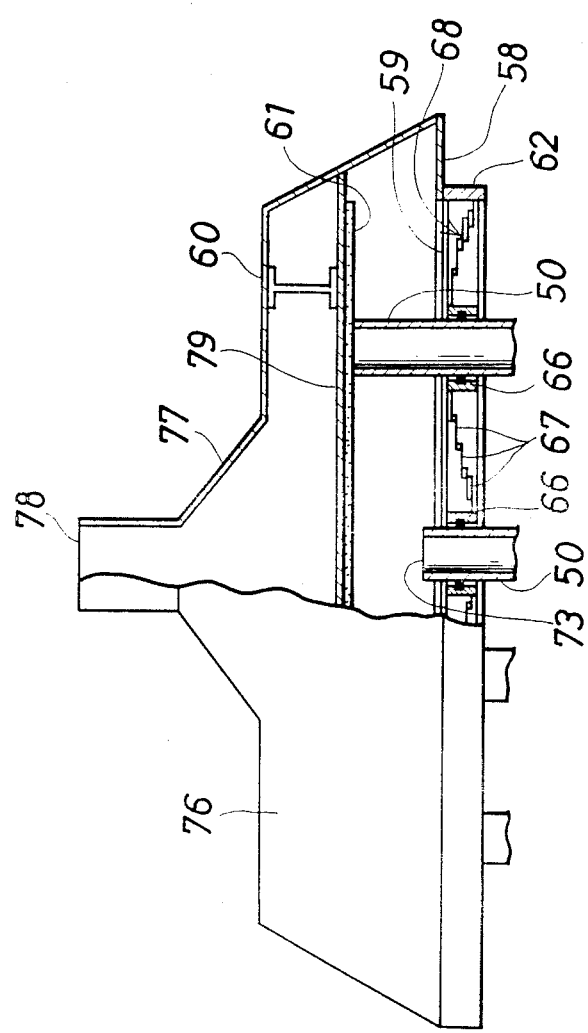

CHIP REMOVING DEVICE FOR MULTI-HEAD MACHINE TOOL

BACKGROUND OF THE INVENTION

1. Field of the Invention

This invention relates to a chip removing device for removing, in a multi-head machine tool such as a wood working machine of the type wherein a plurality of working heads are selectively used, chips of wood or the like from around the working heads by way of vacuum suction while working of the workpiece is proceeding.

2. Description of the Prior Art

A chip removing device of the type mentioned has been already proposed by the inventor of the present patent application. The chip removing device is disclosed in Japanese Utility Model Publication No. 13605/1985 and has such a structure as shown in FIGS. 11 and 12. Referring to FIGS. 11 and 12, a multi-head machine tool in which the chip removing device is incorporated includes a column 1 and a ram 2 mounted for vertical up and down movement on the column 1 and connected to be moved up and down by a motor 3. A plurality of, for example, four, head holders 4 are mounted in a leftward and rightward juxtaposed relationship on the ram 2. A working head 5 is mounted for up and down movement on each of the head holders 4 and connected to be shifted between an upper position and a lower position by an air cylinder 6. Each of the working heads 5 is constructed such that a motor 9 is supported at the center within a hood 8 in which a plurality of suction air passages 7 are defined, and a connecting pipe 10 is secured vertically at the top end of the hood 8 while a brush 11 is provided vertically downwardly on a peripheral edge at the bottom end of the hood 8. A tool 12 such as a router can be removably mounted on a rotary shaft of each of the motors 9.

A duct 13 extends in a horizontal direction on the ram 2. Upper end portions of the connecting pipes 10 of the four working heads 5 are fitted for individual up and down sliding movement in an airtight condition in four holes 14 formed in a lower wall of the duct 13 and extend into the duct 13. Four valve devices 15 corresponding to the four working heads 5 are provided in a juxtaposed relationship in the duct 13. Each of the valve devices 15 includes a valve plate 17 mounted for up and down sliding movement on four guide rods 16 which are securely mounted on and extends vertically upwardly from the lower wall of the duct 13. Each of the valve plates 17 is normally urged downwardly by a compression coil spring 18. Since a stopper 19 is provided at an intermediate location of each of the guide rods 16, each of the valve plates 17 can be moved down only to a predetermined vertical position at which it contacts with the corresponding stoppers 19. A seal member 21 is provided on a lower face of each of the valve plates 17 for closing an upper end opening 20 of the corresponding connecting pipe 10 in an airtight condition.

The duct 13 is connected to a vacuum duct collector not shown. Only an arbitrary one of the four working heads 5 which is to be actually used is shifted to the lower position by the corresponding air cylinder 6 while the other working heads 5 are kept at their upper positions. The connecting pipes 10 of those of the working heads 5 which are kept at the upper positions keep, against the springs 18, the valve plates 17 at corresponding higher positions at which the upper end openings 20 thereof are pressed against and closed in an airtight condition by the seal members 21 to disconnect the suction air passages of the hoods 8 from the duct 13. Consequently, a sucking operation by way of the suction air passages 7 does not take place in the working heads 5 which are kept at the upper positions. On the other hand, the suction air passage 7 of a working head 5 which is positioned at the lower position is connected to the duct 13 by way of the corresponding connecting pipe 10 since the upper end opening 20 of the connecting pipe 10 is positioned below the vertical position of the stopper 19 and thus spaced away from the corresponding seal member 21. Accordingly, chips of wood or the like cut off by the tool 12 mounted on the working head 5 are sucked into the suction air passage 7 and introduced into the duct 13 by way of the connecting pipe 10 whereafter they are transported to a collecting station by way of the duct 13.

However, the conventional device has the following drawbacks.

The valve devices 15 which are complicated in construction must be provided individually for the working heads 5, which requires a correspondingly high cost.

Further, since the valve devices 15 are provided in the duct 13, maintenance thereof is very cumbersome.

Besides, since the valve devices 15 are secured at predetermined positions in the duct 13 such that they may correspond individually to the working heads 5, while the head holder 4 is constructed for leftward and rightward movement relative to the ram 2, the distance between adjacent ones of the working heads 5 can be adjusted but only by a very limited amount.

SUMMARY OF THE INVENTION

It is an object of the present invention to provide an improved chip removing device for a multi-head machine tool which is reduced in cost, facilitates maintenance thereof and allows adjustment of the distance between adjacent working heads by a comparatively great amount.

According to the present invention, a chip removing device for a multi-head machine tool comprises, in order to eliminate valve devices in such a conventional chip removing device as described hereinabove, a horizontally extending common duct having a horizontally elongated slit formed in a lower wall thereof, and an expansible shutter means for normally closing the slit of the duct. A connecting pipe extends upwardly from each of a plurality of working heads of the machine tool, and upper end portions of the connecting pipes extend in an airtight condition through the shutter means into the duct. The shutter means is accommodated for horizontal movement of the working heads such that, when one of the working heads is moved in one or the other horizontal direction, the shutter means is partially expanded and contracted on the opposite sides of the one working head following the one working head so that the closed condition of the slit by the shutter means may be maintained. A horizontally elongated seal plate is secured horizontally within the duct and disposed commonly to the working heads such that, when each of the working heads is at the upper position, the connecting pipe of the working head is pressed at an upper end opening thereof against the seal plate so that the upper end opening is closed in an airtight condition by the seal plate, but when the working head is at the lower position, the upper end opening of the connecting pipe thereof is spaced away from the seal plate and is in an open condition.

The shutter means may be constituted from a large number of slide plates received for sliding movement in guide grooves formed in the opposite side edges of the slit of the duct, the slide plates being associated with each other such that the slide plates may be successively moved when one of the working heads is moved in one or the other horizontal direction. Or otherwise, the shutter means may be constituted from expansible bellows.

The seal plate may be provided on a lower face of an upper wall of the duct, or otherwise may be provided on a lower face of a receiving plate provided at a vertically intermediate position within the duct such that a vacuum sucking action may act at the vertically intermediate position within the duct.

The above and other objects, features and advantages of the present invention will become apparent from the following description and the appended claims, taken in conjunction with the accompanying drawings in white like or corresponding parts are denoted by like reference characters all through the figures.

BRIEF DESCRIPTION OF THE DRAWINGS

FIG. 4 is a perspective view of the portion of the chip removing device shown in FIG. 3;

FIG. 5 is a sectional view of part of a modification to the shutter shown in FIG. 3;

FIG. 7 is a side elevational view, partly in section, of the chip removing device of FIG. 6;

FIG. 8 is a perspective view showing a detailed relationship between a shutter and a connecting pipe for a duct and a working head in the chip removing device of FIG. 6;

FIG. 9 is a front elevational view, partly in section, of a modified duct wherein a seal plate for closing upper end openings of connecting pipes are provided on a lower face of a receiving plate mounted within the duct;

FIG. 10 is vertical section side elevational view of the duct shown in FIG. 9;

DETAILED DESCRIPTION OF THE PREFERRED EMBODIMENTS

Figure 1:
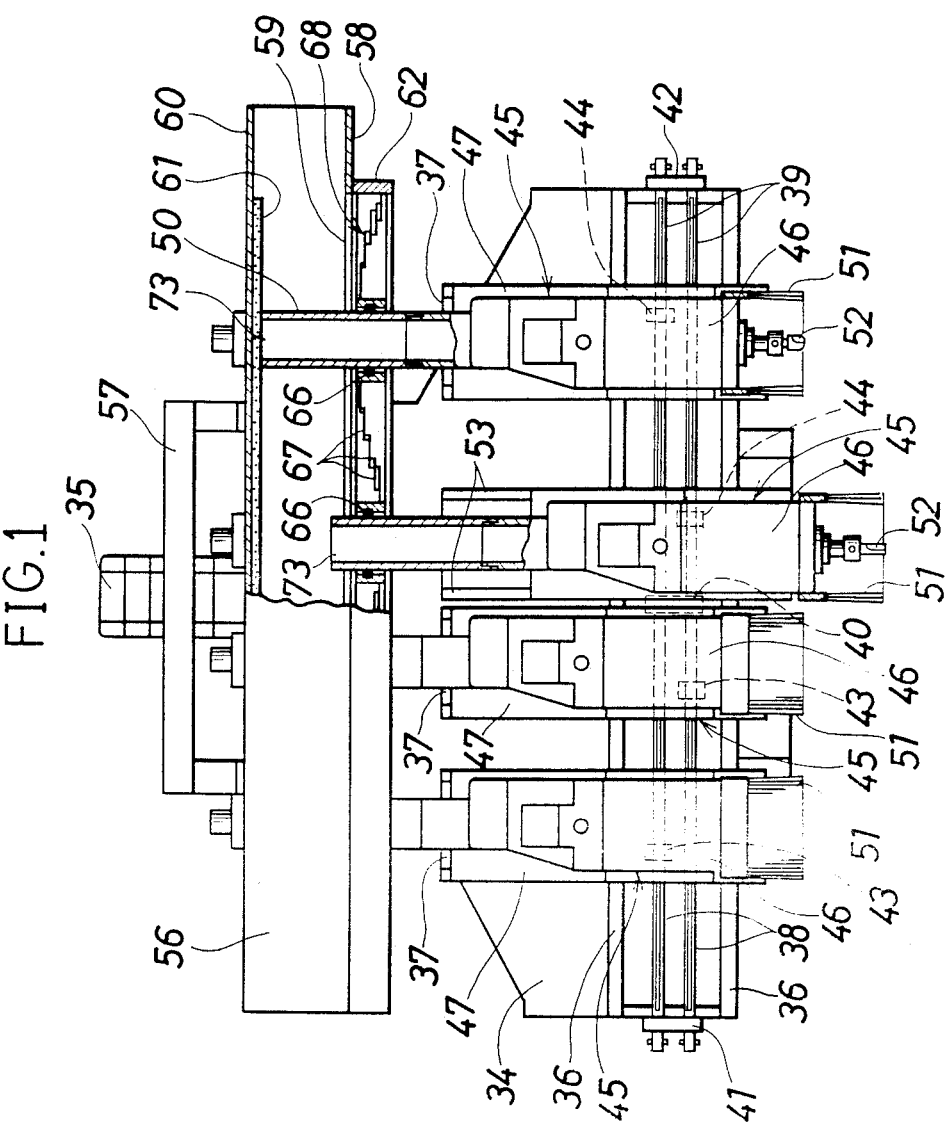
FIG. 1 is a front elevational view, partly in section, of a chip removing device for a multi-head machine tool showing a first preferred embodiment of the present invention.
Figure 2:
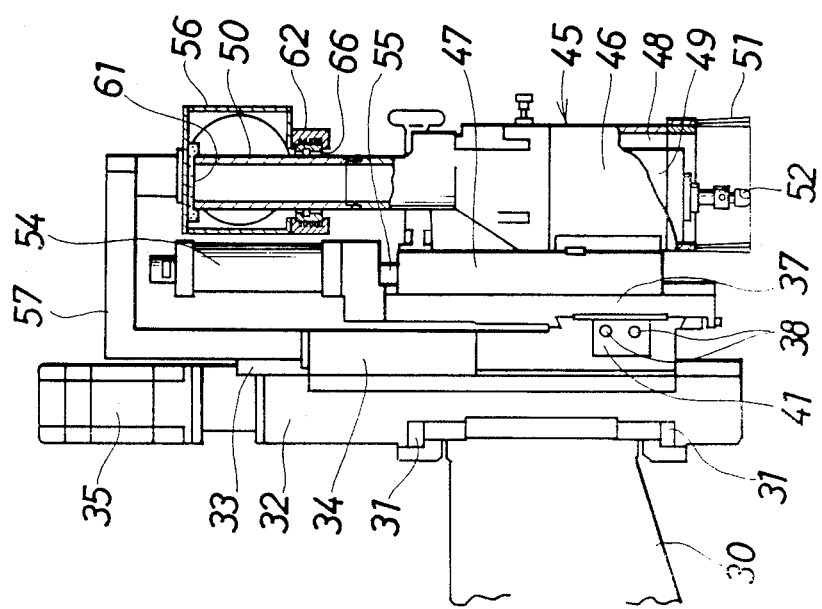
FIG. 2 is a side elevational view, partly in section, of the chip removing device of FIG. 1.

Referring first to FIGS. 1 and 2, there is shown, partly in section, a multi-head machine tool in which a chip removing device according to a first preferred embodiment of the present invention is incorporated. The multi-head machine tool includes a carriage 32 mounted on a front face of a column 30 which is provided uprightly at the center of the machine tool. More particularly, the carrier 32 is mounted for leftward and rightward sliding movement on and along a pair of upper and lower horizontal rails 31 provided horizontally on the front face of the column 30. A pair of left and right vertical rails 33 are provided vertically on a front face of the carriage 32, and a horizontally elongated ram 32 is mounted for up and down sliding movement on and along the vertical rails 33. The ram 34 is connected to a motor 35 carried on the carriage 32 such that, when a screw shaft not shown is rotated by the motor 35, rotation thereof is transmitted as linear motion to the ram 34 by way of a motion converting mechanism not shown to move the ram 34 upwardly or downwardly in accordance with the direction of rotation of the motor 35.

A pair of upper and lower horizontal rails 36 are provided horizontally on a front face of the ram 34, and a plurality of, for example, four, vertically elongated head holders 37 are mounted for leftward and rightward sliding movement along the horizontal rails 36. Further, a pair of upper and lower screw shafts 38 and another pair of upper and lower screw shafts 39 are horizontally supported for individual rotation at left and right locations on the front face of the ram 34. In particular, the left-hand side upper and lower screw shafts 38 are supported for rotation by a central bearing 40 provided at the center of the front face of the ram 34 and a left-hand side bearing 41 provided at the left end of the front face of the ram 34 while the right-hand side upper and lower screw shafts 39 are supported for rotation by the center bearing 40 and a right-hand side bearing 42 provided at the right end of the front face of the ram 34.

The two left-hand side screw shafts 38 are individually screwed in female threaded portions 43 of two left-hand side ones of the head holders 37 while the other two right-hand side screw shafts 39 are individually screwed in female threaded portions 44 of the other two right-hand side head holders 38.

A working head 45 having such a construction as described below is mounted on a front face of each of the head holders 37. In particular, each of the working heads 45 has a mounting base portion 47 provided in an integral relationship thereon behind a corresponding hood 46 and has a plurality of suction air passages 48 defined in a circumferential direction within the hood 46. A motor 49 is supported at the center of the hood 46, and a connecting pipe 50 is fixed vertically to the top end of the hood 46 while a brush 51 is provided vertically downwardly along a peripheral edge of the bottom end of the hood 46. A tool 52 such as a router is removably mounted on a rotary shaft of the motor 49. The mounting base portion 47 of each of the working heads 45 is supported for up and down sliding movement along a pair of left and right vertical rails 53 provided vertically on the front face of the corresponding head holder 37 and is suspended on a piston rod 55 of an air cylinder 54 mounted on the corresponding head holder 37.

Thus, each of the working heads 45 can be individually shifted between upper and lower positions by the air cylinder 54 on the corresponding head holder 37. Further, the four head-holders 37 can be slidably moved leftwardly or rightwardly individually along the upper and lower horizontal rails 36 by rotating the corresponding screw shafts 38 or 39. Consequently, the distance between adjacent ones of the four working heads 45 can be adjusted arbitrarily.

A duct 56 in the form of a rectangular tube common to the four working heads 45 is provided horizontally on the ram 34 by means of a bracket 57. The duct 56 is closed at one end but is open at the other end thereof, and the open end of the duct 56 is connected to a vacuum dust collector not shown by way of a hose or the like not shown so that dust may be sucked from the duct 56 into the vacuum dust collector. The duct 56 has a longitudinally elongated slit 59 formed in a lower wall thereof while a seal plate 61 formed from a rubber plate or the like having a substantially same length as that of the slit 59 is adhered to a lower face of an upper wall 60 of the duct 56. A rail frame 62 is securely mounted on a lower face of the lower wall 58 of the duct 56 covering the entire area of the slit 59.

Referring also to FIG. 4, the rail frame 62 has a pair of front and rear rail portions 63 on each of which a large guide groove 64 is provided, and a plurality of small guide grooves 65 are formed parallelly in a predetermined spaced relationship in a vertical direction on the bottom of each of the guide grooves 65. Four rectangular flange members 66 through which the connecting pipes 50 of the working heads 45 individually extend in such a manner as hereinafter described are fitted for sliding movement in the large guide grooves 64 of the rail frame 62 while a large number of slide plates 67 which cooperate with each other to interconnect the flange members 66 are fitted for sliding movement in the small guide grooves 65. A continuous shutter 68 which normally closes the slit 59 of the lower wall 58 of the duct 56 is thus generally constructed by the four flange members 66 and the large number of slide plates 67.

Figure 3:
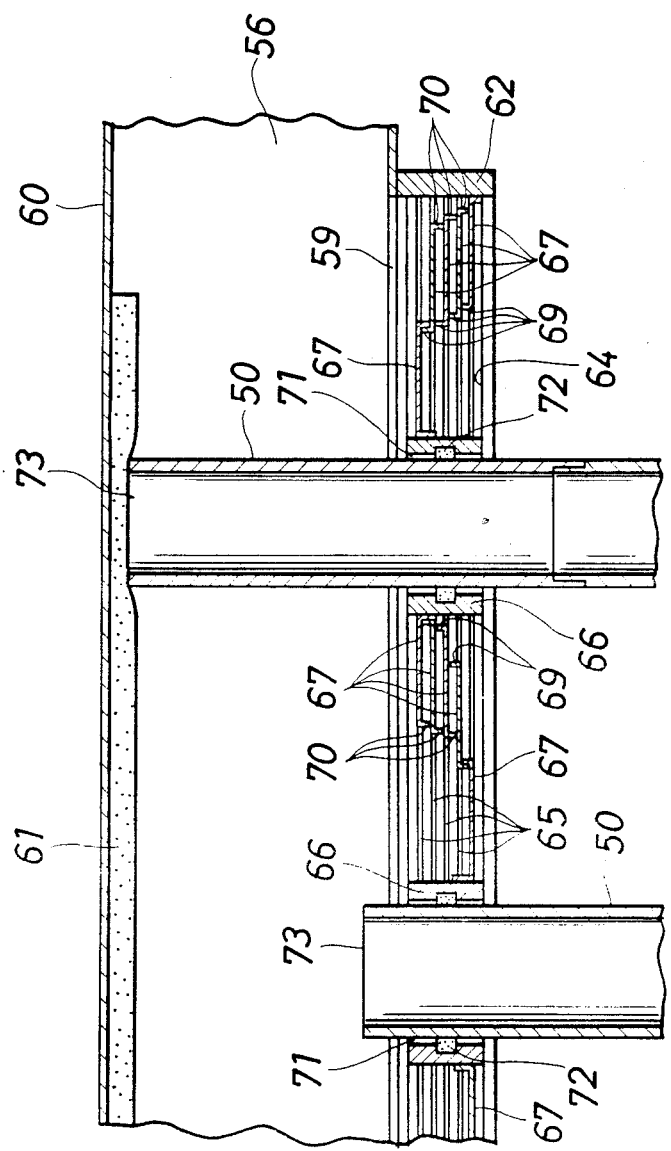
FIG. 3 is an enlarged sectional view showing a detailed relationship between a shutter and a connecting pipe for a duct and a working head in the chip removing device in FIG. 1.

Referring also to FIG. 3, the opposite end ones of the slide plates 67 of the shutter 68 are secured to rail frame 62 adjacent the opposite longitudinal ends of the slit 59 while those of the slide plates 67 which are positioned on the opposite sides of each of the flange members 66 are fixed to the opposite side faces of the flange member 66. Each of the slide plates 67 has at the opposite ends thereof a pair of bent portions 69 and 70 which extend in the vertically opposite directions such that the opposite ends thereof may individually contact for sliding movement with lower and upper faces of the opposite adjacent slide plates 67 and adjacent bent portions 69 and 70 of each adjacent ones of the slide plates 67 may engage with each other. Each of the flange members 66 has a through-hole 71 formed therein, and the connecting pipes 50 are individually fitted for sliding up and down movement in the through-holes 71 of the flange members 66. A packing 72 is provided in each of the through-holes 71 for sealing between the corresponding connecting pipe 50 and flange member 66 in an airtight condition.

In the machine tool having the chip removing device having such a construction as described above, only one of the four working heads 45 which is to be actually used is shifted to the lower position by the corresponding air cylinder 54 while the other three working heads 45 are kept at their upper positions. At each of the three working heads kept at the upper positions, the upper end opening 73 of the connecting pipe 50 is pressed against and closed airtight by the seal plate 61 so that it is disconnected from the inside of the duct 56. Consequently, the connecting pipe 50 is not acted upon by a vacuum sucking action. On the contrary, at the working head 45 at the shifted lower position, the upper end opening 73 of the connecting pipe 50 is spaced away from the seal plate 61 and is thus communicated with the inside of the duct 56. Consequently, the connecting pipe 50 is acted upon by a vacuum sucking action. Accordingly, at the working head 45 at the lower position, when wood or the like is machined by the tool 52, chips cut off then are sucked into the suction air passage 48 of the hood 46 and then introduced into the duct 56 by way of the connecting pipe 50 whereafter they are transported to the dust collecting station by way of the duct 56.

If one of the screw shafts 38 and 39 is rotated to slidably move an arbitrary one of the head holders 37 leftwardly or rightwardly along the horizontal rails 36 in FIG. 1 as described above, then the working head 45 held on the head holder 37 is moved in an integral relationship whereupon the flange member 66 through which the connecting pipe 50 extends is slidably moved leftwardly or rightwardly in an integral relationship along the large guide grooves 64 of the rail frame 62.

Now, if the working head 45 at the lower position is moved leftwardly in FIG. 1, those of the slide plates 67 which are positioned on the right-hand side of the flange member 66 corresponding to the working head 45 are slidably moved leftwardly along the small guide grooves 65 of the rail frame 62 successively like a chain with the downwardly extending bent portions 70 thereof successively engaged with the upwardly extending bent portions 69 of the right-hand side adjacent slide plates 67 so that they are extended as a whole. On the other hand, those of the slide plates 67 which are positioned on the left-hand side of the flange member 66 are pushed by the flange member 66 and slidably moved leftwardly along the small guide grooves 65 while the downwardly extending bent portions 70 thereof are spaced away from the upwardly extending bent portions 69 of the left-hand side adjacent slide plates 67 so that they are overlapped with each other and are contracted as a whole. Accordingly, the shutter 68 always closes the slit 59 of the duct 56 even if the flange members 66 and the slide plates 67 which constitute the shutter 68 as a whole are slidably moved along the guide frame 62.

It is to be noted that a seal member 74 should be provided on at least one of the bent portions 69 and 70 of each of the slide plates 67 as shown in FIG. 5 in order to improve the airtight property between each adjacent slide plates 67.

Figure 6:
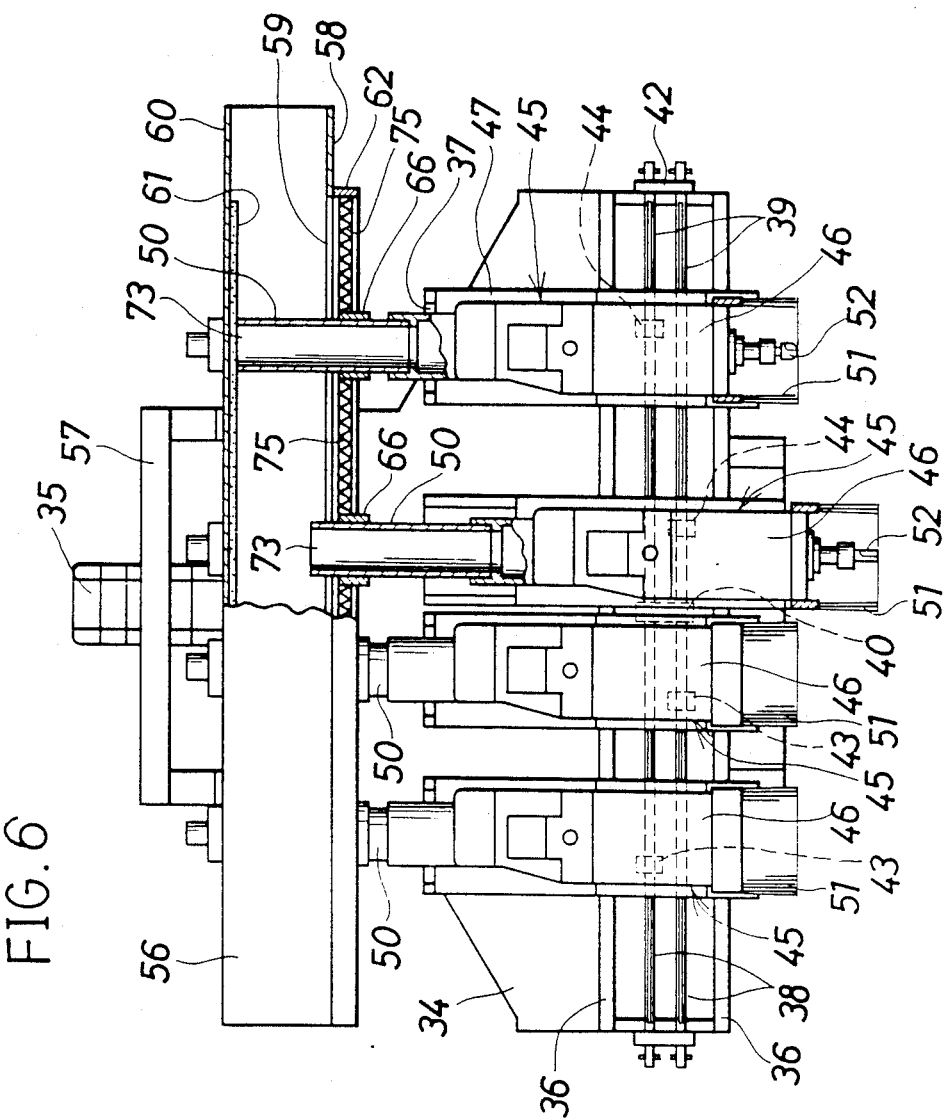
FIG. 6 is a front elevational view, partly in section, of a chip removing device for a multi-head machine tool showing a second preferred embodiment of the present invention.
Figure 11:
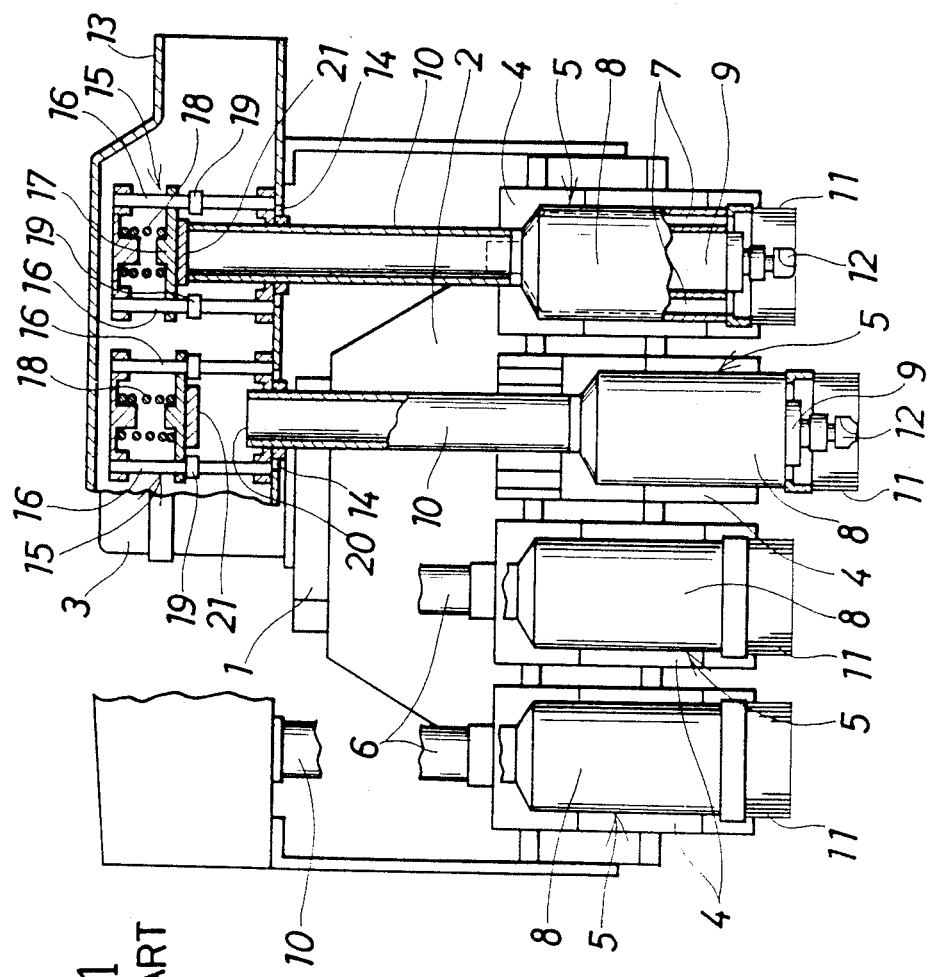
FIG. 11 is a front elevational view, partly in section, of a conventional chip removing device for a multi-head machine tool.
Figure 12:
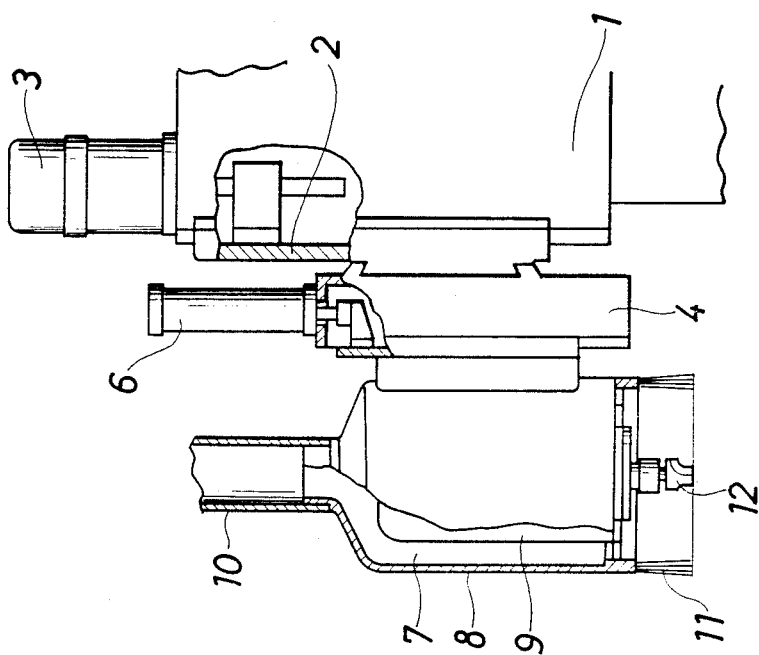
FIG. 12 is a side elevational view, partly in section, of the chip removing device of FIG. 11.

Referring now to FIGS. 6 to 8, there is shown a chip removing device for a multi-head machine tool according to a second embodiment of the present invention. The chip removing device is a modification to the chip removing device of the first embodiment and is only different in its shutter for closing the slit 59 of the duct 56. In particular, a bellows 75 extends between each adjacent ones of the four flange members 66 through which the connecting pipes 50 of the four working heads 45 extend and also between each of the opposite end flange members 66 and a corresponding portion of the rail frame 62 adjacent the slit 59. The bellows 75 are fitted for sliding movement to expand or contract themselves in the guide grooves 64 of the front and rear rail portions 63 of the rail frame 62. The flange members 66 and the bellows 75 thus construct the shutter 68 as a whole.

In the case of the chip removing device of the present embodiment, there is the possibility that chips may be accumulated between adjacent corrugations of the bellows 75 to hinder expanding and contracting movement of the bellows 75 while the chip removing device of the first embodiment is free from the problem because chips will slip on the slide plates 67. However, the chip removing device of the second embodiment is simpler in structure than the chip removing device of the first embodiment described above.

Referring now to FIGS. 9 and 10, there is shown a modification to the duct 56 described hereinabove. The modified duct generally denoted at 76 is closed at the longitudinal opposite ends thereof, but has a connecting opening 78 at the center of a trapezoidal projection 77 extending upwardly therefrom so that chips may be sucked by way of the connecting opening 78 from the inside of the duct 76. Meanwhile, a seal plate 61 is adhered to a lower face of a receiving plate 79 provided horizontally at an intermediate vertical position within the duct 76. Where such structure is employed, the top end openings 73 of the connecting pipes 50 are directed in the same direction as the direction in which chips are sucked by way of the connecting port 78, and consequently, the vacuum sucking effect is higher than those in the chip removing devices of the first and second embodiments described hereinabove.

Having now fully described the invention, it will be apparent to one of ordinary skill in the art that many changes and modifications can be made thereto without departing from the spirit and scope of the invention as set forth herein.

What is claimed is:

1. A chip removing device for a multi-head machine tool comprising:
   a ram;
   a plurality of working heads, each including a motor and individually movably mounted on the ram;
   individual head holders for moving the heads in horizontal opposite directions;
   an actuator for moving each of the heads selectively between an upper position and a lower position;
   means for defining a suction air passage around each said motor;
   a connecting pipe extending from an upper portion of each of said working heads;
   a horizontally extending common duct, connected commonly to each said connecting pipe, for causing a vacuum sucking action to act upon said working heads therethrough to collect chips produced by said working heads, said duct having a horizontally elongated slit formed in a lower wall thereof;
   expansible shutter means for normally closing said slit of said common duct, upper end portions of said connecting pipes extending in an airtight condition through said shutter means into said duct, said shutter means opening and closing in response to horizontal movement of said working heads such that, when one of said working heads is moved in one of said horizontal opposite directions, said shutter means is partially expanded and contracted on opposite sides of said one of said working heads; and
   a horizontally elongated seal plate, secured horizontally within said duct and disposed commonly to said working heads such that, when each of said working heads is at the upper position, said connecting pipe of said one of said working heads is pressed at an upper end opening thereof against said seal plate so that said upper end opening is closed in an airtight condition by said seal plate, but when the working head is at the lower position, said upper end opening of said connecting pipe is spaced away from said seal plate and is in an open condition.

2. A chip removing device for a multi-head machine tool as claimed in claim 1, wherein said shutter means comprises a plurality of slide plates received for sliding movement in guide grooves formed in the opposite side edges of said slit of said duct, said slide plates cooperating with each other for successive movement when one of said working heads is moved in one or the other of said horizontal opposite directions.

3. A chip removing device for a multi-head machine tool as claimed in claim 1, wherein said shutter means comprises expansible bellows.

4. A chip removing device for a multi-head machine tool as claimed in claim 1, wherein said seal plate is provided on a lower face of an upper wall of said duct.

5. A chip removing device for a multi-head machine tool as claimed in claim 1, further comprising a receiving plated provided at a vertically intermediate position within said duct, wherein said seal plate is provided on a lower face of said receiving plate such that said vacuum sucking action acts at the vertically intermediate position within said duct.

* * * * *